July 14, 1931.   J. JOHNSON   1,814,755
GRAIN THRASHER
Filed April 20, 1927

INVENTOR.
Joseph Johnson
BY
*Fry Oberlin & Fay*
ATTORNEYS

Patented July 14, 1931

1,814,755

UNITED STATES PATENT OFFICE

JOSEPH JOHNSON, OF BUTTERFIELD, MINNESOTA

GRAIN THRASHER

Application filed April 20, 1927. Serial No. 185,237.

This invention as indicated relates to grain thrashers. More particularly it comprises a straw spreading device supported upon the first section of the separating rack of a standard type of grain thrasher and adapted to project over the second section of said rack, preferably a distance of approximately one-half the width of said second section. The device may be built of either wood or metal or may be formed as a continuation of the middle slat of the first section of the rack.

It has heretofore been found that notwithstanding the various features embodied in a separating rack designed to remove all grain from the straw in the course of a threshing operation, that the recovery of grain has been far from complete and that this is due to the bunching of the straw centrally of the separating rack and the capture of grain in the heaped up portions of straw which the agitating action of the separating rack failed to remove prior to the discharge of the straw from the threshing apparatus.

The present invention has for its principal object to obviate the difficulty referred to and to provide a device for spreading the straw upon the separating rack so that the amount of waste grain will be reduced to a minimum. A further object of the invention is to provide a device which may readily be applied to standard forms of separating racks now in use to improve the grain recovery by means of said racks.

Other and further objects of the invention will appear in the course of the following description. To the accomplishment of the foregoing and related ends, said invention, then consists of the means hereinafter fully described and particularly pointed out in the claim.

The annexed drawings and the following description set forth in detail certain mechanism embodying the invention, such disclosed means constituting, however, but one of various mechanical forms in which the principle of the invention may be used.

Figure 1:
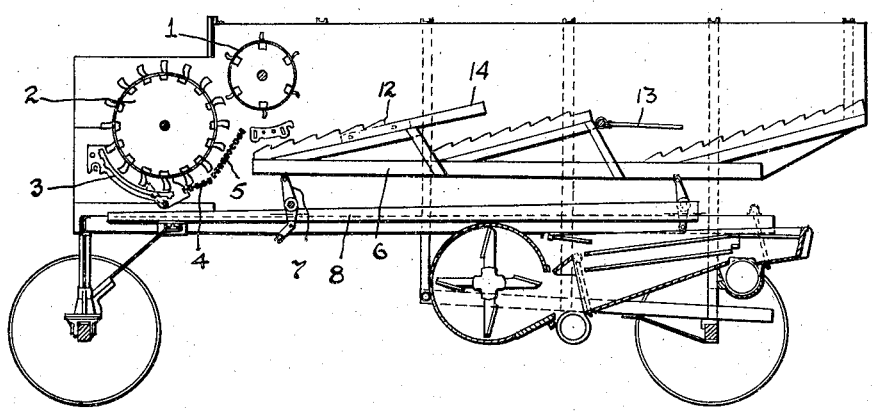
Figure 2:
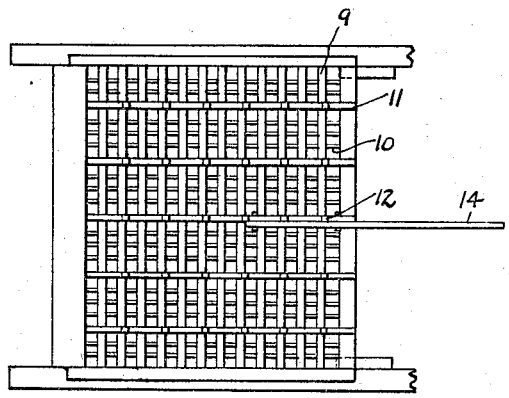

In said annexed drawings:

Fig. 1 is a side elevation of a central vertical sectional view of a grain thrasher with a separating rack equipped with the improvements embodying the principles of my invention; and Fig. 2 is a top plan view of the first section of the separating rack showing a straw spreader attached to the central longitudinal slat of the first section of the straw rack.

As is clearly shown in Fig. 1 of the drawings, the threshing apparatus comprises the usual drum beater 1, cylinder 2, concave hanger 3, and grates 4, 5, and a separating rack 6 formed in three sections. The separating rack is supported on a plurality of rocker arms 7 above a grain pan 8. The separating rack, as stated, is formed in three sections, each made up of a plurality of transverse and longitudinal strips 9, 10, and having a series of longitudinal slats 11 set on edge on the upper side of said inclined sections, said slats being serrated so as to present rearwardly facing vertical teeth 12. The rack sections or breaks are inclined upwardly toward the rear of the apparatus and said sections are spaced from adjacent sections by a "drop" in the rack. An agitator 13 comprising a projecting hinged screen may be attached at the end of the second break and a straw spreader 14 forming the essential feature of my invention may be attached centrally to project from the rearward edge of the first section. This straw spreader as illustrated, comprises a slat which may be built of either wood or metal or may be formed an integral continuation of the middle slat of the first section provided a distributing means over which the straw moved rearwardly from the first section will pass as it drops on to the second section. Where there is no spreading device the tendency of the straw in passing rearwardly over the separating rack is to become heaped up centrally and thinned out adjacent the edges of the rack. Through the use of the spreading device the accumulation of straw at the center of the rack is avoided and the straw is distributed evenly at approximately the same thickness on the outside as in the center of the straw rack. The device effectively breaks up all bunches of straw and in this manner prevents the capturing of grain within such straw bunches as they are ejected from the rearward end of the machine. It has been found in practice that the amount of waste grain which is not recovered through the separating rack may be reduced to less than one-half of what the amount would be were the device not installed.

Where a section of a separating rack is of about three feet in width the length to which the central slat should project above such section is preferably about fifteen inches. The proportions, however, may be varied to suit any particular condition in the apparatus to which the slat is to be applied.

Other modes of applying the principle of my invention may be employed instead of the one explained, change being made as regards the mechanism herein disclosed, provided the means stated by the following claim or the equivalent of such stated means be employed.

I therefore particularly point out and distinctly claim as my invention:

A straw rack for threshing machines comprising a plurality of inclined sections, a single central slat projecting rearwardly from one of said sections to force the straw passing over said rack to engage said slat and to move to both sides thereof and thus prevent the straw becoming heaped up centrally and thinned out adjacent the edges of the adjacent section.

Signed by me this 9th day of April, 1927.

JOSEPH JOHNSON.